US012405557B2

(12) United States Patent
Hatakeyama

(10) Patent No.: US 12,405,557 B2
(45) Date of Patent: Sep. 2, 2025

(54) FIXING DEVICE INCLUDING CASING, HARNESS, AND HARNESS HOLDER HOLDING HARNESS IN COOPERATION WITH CASING

(71) Applicant: BROTHER KOGYO KABUSHIKI KAISHA, Nagoya (JP)

(72) Inventor: Shinichi Hatakeyama, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/433,545

(22) Filed: Feb. 6, 2024

(65) Prior Publication Data

US 2024/0280928 A1 Aug. 22, 2024

(30) Foreign Application Priority Data

Feb. 16, 2023 (JP) ................................ 2023-022334

(51) Int. Cl.
*G03G 15/20* (2006.01)
*G03G 15/00* (2006.01)
(Continued)

(52) U.S. Cl.
CPC ..... *G03G 15/2017* (2013.01); *G03G 15/2053* (2013.01); *G03G 15/80* (2013.01);
(Continued)

(58) Field of Classification Search
CPC ........... G03G 15/2017; G03G 15/2053; G03G 15/80; G03G 21/1652; G03G 2221/166; H05B 3/06; H05B 3/08
(Continued)

(56) References Cited

U.S. PATENT DOCUMENTS 4,883,945 A * 11/1989 Bautista ............... H01R 13/595 219/541
8,995,868 B2 * 3/2015 Moriya .................. G03G 15/80 399/90

(Continued)

FOREIGN PATENT DOCUMENTS

| | | | |
|---|---|---|---|
| JP | 2018146956 | A | 9/2018 |
| JP | 2018151591 | A | 9/2018 |
| WO | WO-2007060952 | A1 | 5/2007 |

*Primary Examiner* — Robert B Beatty
(74) *Attorney, Agent, or Firm* — Element IP, PLC

(57) ABSTRACT

A fixing device includes: a casing; a heating portion; a pressure portion; a connector; a harness; and a harness holder. The heating portion extends in a first direction. The pressure portion is configured to form a nipping region between the pressure portion and the heating portion. The connector is detachably attached to the heating portion. The harness is connected to the connector for supplying electric power to the heating portion through the connector. The harness holder is fixed to the casing and positioned upstream relative to the connector in an attachment direction of the connector to the heating portion. The attachment direction crosses the first direction. The harness holder holds the harness between the harness holder and the casing. The harness holder is configured to restrict movement of the connector by making contact with the connector in a case where the connector moves upstream in the attachment direction.

10 Claims, 6 Drawing Sheets

(51) Int. Cl.
*G03G 21/16* (2006.01)
*H05B 3/08* (2006.01)

(52) U.S. Cl.
CPC ........... *G03G 21/1652* (2013.01); *H05B 3/08* (2013.01); *G03G 2221/166* (2013.01)

(58) Field of Classification Search
USPC .................... 399/90, 320, 328; 219/216, 541
See application file for complete search history.

(56) References Cited

U.S. PATENT DOCUMENTS

| | | | | |
|---|---|---|---|---|
| 2009/0149055 | A1 | 6/2009 | Uchikawa et al. | |
| 2018/0024480 | A1* | 1/2018 | Fujita ................ | G03G 15/2039 399/33 |
| 2018/0253054 | A1 | 9/2018 | Tanto | |
| 2019/0041782 | A1* | 2/2019 | Nishikawa ......... | G03G 15/2053 |
| 2021/0255577 | A1* | 8/2021 | Midorikawa ............. | F16L 3/12 |
| 2021/0364958 | A1* | 11/2021 | Someya .................. | B32B 37/06 |

* cited by examiner

FIXING DEVICE INCLUDING CASING, HARNESS, AND HARNESS HOLDER HOLDING HARNESS IN COOPERATION WITH CASING

REFERENCE TO RELATED APPLICATIONS

This application claims priority from Japanese Patent Application No. 2023-022334 filed on Feb. 16, 2023. The entire content of the priority application is incorporated herein by reference.

BACKGROUND ART

There has been conventionally known a fixing device including a frame, a heater, a connector, and a guide member. The heater is movably supported by the frame. The connector is attached to an end portion of the heater. A harness is connected to the connector.

The guide member has a U-shaped recess for guiding the harness. The recess is opened toward one side in a moving direction of the heater.

The connector is detachably attached to the end portion of the heater along a short-side direction of the heater. The guide member regulates movement in the short-side direction of the connector to restrain unintentional detachment of the connector from the heater.

SUMMARY

However, according to the conventional fixing device described above, the harness is merely accommodated in the recess of the guide member. Hence, there is a likelihood that, when the heater moves, the harness comes out of the recess and irregularly moves, which leads to contact of the harness with other components therearound to interfere with operations of the other components.

In view of the foregoing, it is an object of the present disclosure to provide a fixing device in which a harness connected to a connector is restrained from moving irregularly and contacting other components positioned around the harness to interfere with operations of the other components.

In order to attain the above and other object, the present disclosure provides a fixing device including: a casing; a heating portion; a pressure portion; a connector; a harness; and a harness holder. The heating portion extends in a first direction and is configured to apply heat to a sheet. The pressure portion is configured to form a nipping region between the pressure portion and the heating portion. The connector is detachably attached to the heating portion. The harness is connected to the connector for supplying electric power to the heating portion through the connector. The harness holder is fixed to the casing. The harness holder is positioned upstream relative to the connector in an attachment direction of the connector to the heating portion. The attachment direction crosses the first direction. The harness holder holds the harness between the harness holder and the casing. The harness holder is configured to restrict movement of the connector by making contact with the connector in a case where the connector moves upstream in the attachment direction.

In the above structure, the harness holder holds the harness between the casing and the harness holder, thereby restraining interference of the harness with operations of other components in the vicinity thereof due to contact of the harness with the other components occurred by irregular movement of the harness. Also, since the harness holder is fixed to the casing and positioned upstream relative to the connector in the attachment direction, detachment of the connector from the heating portion can be restrained using the harness holder.

DESCRIPTION

Hereinafter, one embodiment of the present disclosure will be described in detail while referring to the accompanying drawings.

Figure 1A:
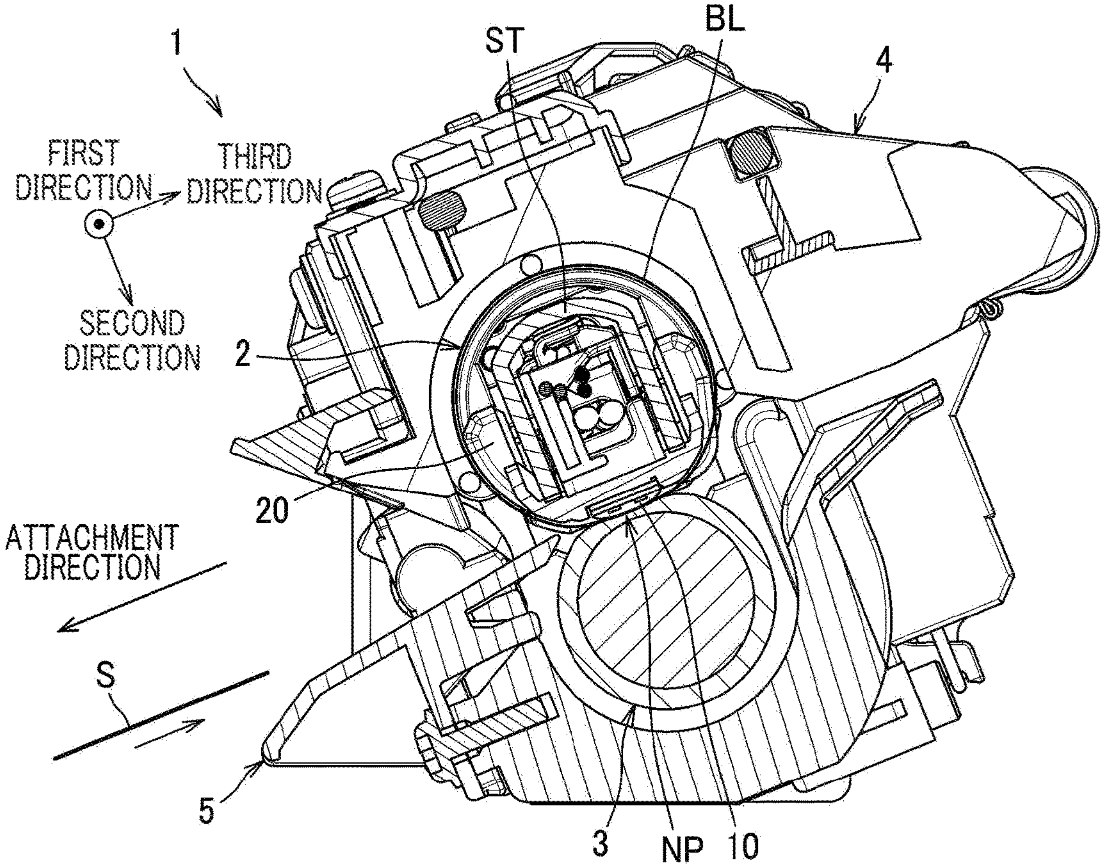
FIG. 1A is a cross-sectional view of a fixing device.

A fixing device 1 illustrated in FIG. 1A is a device configured to fix a toner image onto a sheet S. The fixing device 1 is attachable to a main casing of an image-forming apparatus such as a printer. The fixing device 1 includes a heating unit 2 as an example of the heating portion, a pressure roller 3 as an example of the pressure portion, a casing 4, and a guide 5. The casing 4 and the guide 5 are made of resin, for example.

In the following description, when the description will be made with reference to directions, a first direction, a second direction, and a third direction which are illustrated in FIG. 1A are used for the description. In the present embodiment, the first direction is a direction along an axial direction of the pressure roller 3. The first direction is also a direction along a width direction of the sheet S.

The second direction is a direction orthogonal to the first direction. The second direction is a direction in which the heating unit 2 and the pressure roller 3 nip the sheet S in cooperation with each other. The third direction is a direction orthogonal to both the first direction and the second direction. The third direction is also a conveying direction in which the sheet S is conveyed at a nipping region formed between the heating unit 2 and the pressure roller 3.

Note that arrows for these directions in the drawings each point to one side of the respective direction. That is, a leading side of the arrows corresponds to the one side of the respective directions, and a trailing side of the arrows corresponds to the other side of the respective directions. An end portion of the one side in the respective directions will also be referred to as "one end portion", and an end portion of the other side in the respective directions will also be referred to as "another end portion".

The heating unit 2 is elongated in the first direction. Specifically, the heating unit 2 has a dimension in the first direction that is greater than a dimension in the second direction of the heating unit 2 and a dimension in the third direction of the heating unit 2. The heating unit 2 includes a heater 10, a holder 20, a heat conductive member 30, a stay ST, and a belt BL.

The heater 10 is configured to apply heat to the sheet S through the belt BL. The heater 10 has a plate shape elongated in the first direction.

Figure 1B:
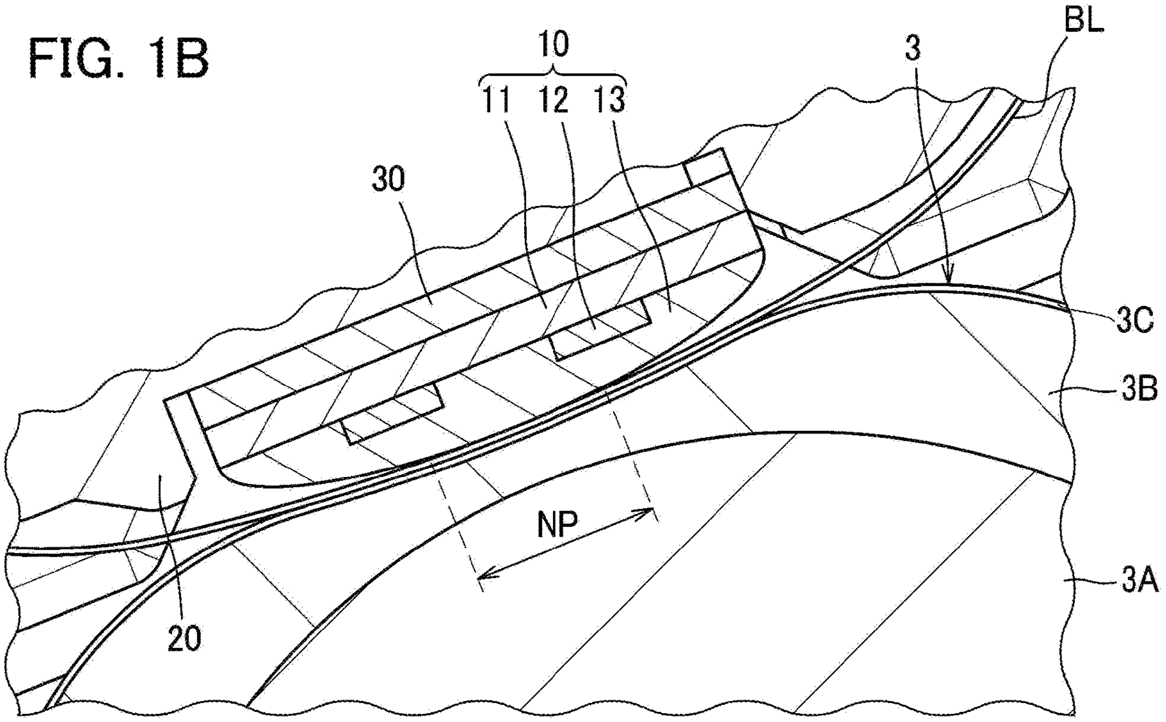
FIG. 1B is a partially enlarged cross-sectional view illustrating a portion in the vicinity a heater.

As illustrated in FIG. 1B, the heater 10 includes a base plate 11, resistance heating elements 12 supported by the base plate 11, and a cover 13. The base plate 11 is a slender rectangular-shaped plate having two long sides and two short sides. In the present embodiment, the base plate 11 is configured of ceramic plate made of aluminum oxide. The heater 10 is so-called ceramic heater. Each of the resistance heating elements 12 is formed on one surface of the base plate 11 by printing. The cover 13 covers the resistance heating elements 12. The cover 13 is made of, for example, glass.

In the following description, a direction in which the long side of the rectangular base plate 11 extends will be referred to as “long-side direction” and a direction in which the short side of the rectangular base plate 11 extends will be referred to as “short-side direction”. The long-side direction and the short-side direction are orthogonal to each other. Note that the long-side direction is a direction parallel to the first direction, and the short-side direction is a direction parallel to the third direction.

The heat conductive member 30 is configured to conduct heat in the long-side direction so as to provide uniform temperature along the entire length of the heater 10 in the long-side direction. The heat conductive member 30 has a plate shape, and is positioned between the heater 10 and the holder 20. When a sheet S is nipped between the heating unit 2 and the pressure roller 3, the heat conductive member 30 is nipped between the heater 10 and the holder 20. The heat conductive member 30 is made of aluminum, for example.

As illustrated in FIG. 1A, the holder 20 supports the heater 10 and functions to guide circular movement of the belt BL. The holder 20 is made of resin, for example.

The stay ST supports the holder 20. The stay ST is made of metal, for example.

The belt BL is an endless belt. The heater 10 is positioned in a space encircled by the belt BL. The belt BL is circularly movable around the heater 10 while being guided by the holder 20. The belt BL has an outer peripheral surface, and an inner peripheral surface. The outer peripheral surface makes contact with the pressure roller 3 or a sheet S which is a target to be heated. The inner peripheral surface makes contact with the heater 10.

The belt BL is configured to convey the sheet S in cooperation with the pressure roller 3 by circularly moving.

As illustrated in FIG. 1B, the pressure roller 3 is a roller that is rotatable. The pressure roller 3 is configured to nip the sheet S between the pressure roller 3 and the belt BL in the second direction. The pressure roller 3 and the belt BL are configured to form a nipping portion NP between the pressure roller 3 and the belt BL. The pressure roller 3 and the heater 10 are configured to nip the belt BL between the pressure roller 3 and the heater 10. The pressure roller 3 and the belt BL are configured to convey the sheet S between the pressure roller 3 and the belt BL.

The pressure roller 3 includes a shaft 3A, an elastic layer 3B, and a surface layer 3C.

The shaft 3A has a solid cylindrical shape. For example, the shaft 3A is made of metal.

The elastic layer 3B has a hollow cylindrical shape. For example, the elastic layer 3B is made of silicone rubber, for example. The elastic layer 3B covers the shaft 3A. The elastic layer 3B has the surface layer 3C on a peripheral surface thereof.

The surface layer 3C is made of fluorocarbon polymer, for example. The surface layer 3C covers the peripheral surface of the elastic layer 3B.

The casing 4 supports the pressure roller 3 such that the pressure roller 3 is rotatable. The casing 4 also supports the heating unit 2 such that the heating unit 2 is movable in the second direction.

Figures 2A, 2B:
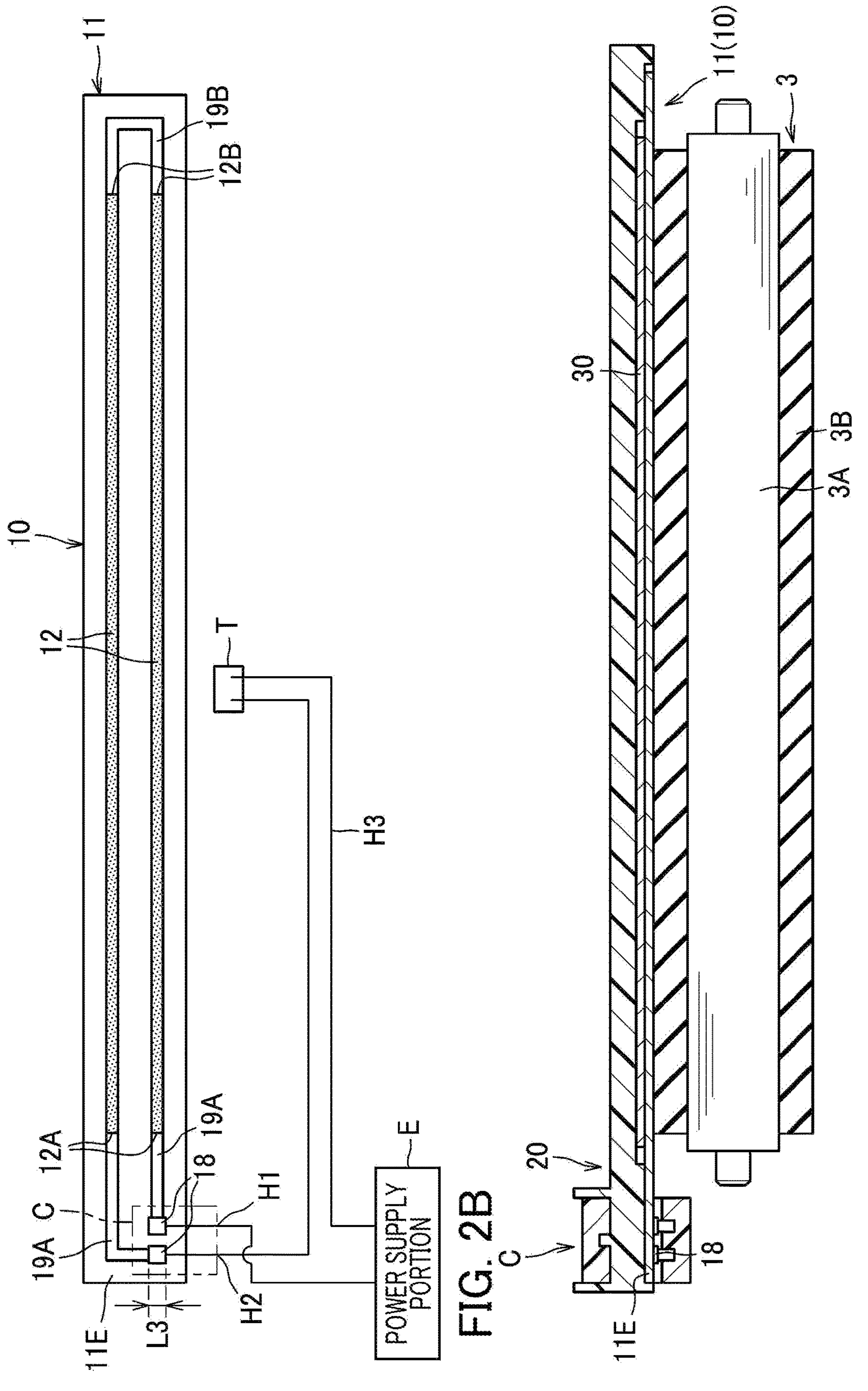
FIG. 2A is a view showing a relationship among the heater, a connector, a power supply portion, and a thermostat.
FIG. 2B is a cross-sectional view of the heater and components in the vicinity thereof taken along a plane extending in a long-side direction.

As illustrated in FIG. 2A, the heater 10 includes two of the resistance heating elements 12 in the present embodiment. The two resistance heating elements 12 are elongated parallel to each other in the long-side direction, and arranged to be spaced apart from each other in the short-side direction orthogonal to the long-side direction. Each of the resistance heating elements 12 has one end 12A connected to one end of a lead wire 19A. Each of the lead wires 19A has another end at which a power supply terminal 18 of the heating unit 2 for supplying electric power to the corresponding resistance heating element 12 is provided.

Each of the power supply terminals 18 is electrically connected to the corresponding resistance heating element 12 through the corresponding lead wire 19A. The power supply terminals 18 are positioned at one end portion 11E in the long-side direction of the base plate 11. As illustrated in FIGS. 2A and 2B, the fixing device 1 further includes a connector C through which electric power is supplied to the heater 10. The connector C is connected to the power supply terminals 18. Accordingly, the power supply terminals 18 receive electric power through the connector C. In FIG. 2B, the two resistance heating elements 12, the cover 13, the belt BL, and the surface layer 3C are not illustrated to facilitate understanding.

Each of the resistance heating elements 12 also has another end 12B opposite the one end 12A. The other ends 12B of the resistance heating elements 12 are connected to each other through a lead wire 19B. Note that the number of resistance heating elements 12 is not particularly limited.

Further, the resistance heating elements 12 may be configured of two types of heating resistors: a first heating resistor and a second heating resistor which are elongated in the long-side direction. The first heating resistor may have a center portion in the long-side direction configured to generate a heat quantity greater than that generated at end portions in the long-side direction thereof, and the second heating resistor may have end portions in the long-side direction configured to generate a heat quantity greater than that generated at a center portion in the long-side direction thereof. The first and second heating resistors may be controlled individually in order to control distribution of heat generation with respect to the long-side direction.

As illustrated in FIG. 2A, the fixing device 1 further includes a power supply portion E, a thermostat T, and harnesses H1 to H3.

The power supply portion E is configured to supply electric power to the heater 10. The power supply portion E is provided at the main casing of the image-forming apparatus.

The thermostat T is a switch configured to electrically break a circuit when a temperature of the thermostat T itself exceeds a threshold value. The thermostat T is connected in series between the heater 10 and the power supply portion E, and arranged at a position where the thermostat T is heated by the heater 10. In a case where the temperature of the heater 10 exceeds the threshold value for some reason, the thermostat T is activated to electrically break the circuit between the heater 10 and the power supply portion E. This operation suppresses the temperature of the heater 10 from exceeding the threshold value and becoming higher.

The harness H1 and the harness H2 are connected to the connector C. The harness H1 is connected to the connector C and the power supply portion E. The harness H2 extends from the connector C to an inside of the casing 4 and is connected to the thermostat T.

The harness H3 is connected to the thermostat T and the power supply portion E. Specifically, the harness H3 extends from the thermostat T positioned inside the casing 4 toward a side surface 44 of the casing 4 that is positioned near the connector C to be connected to the power supply portion E.

Figure 3:
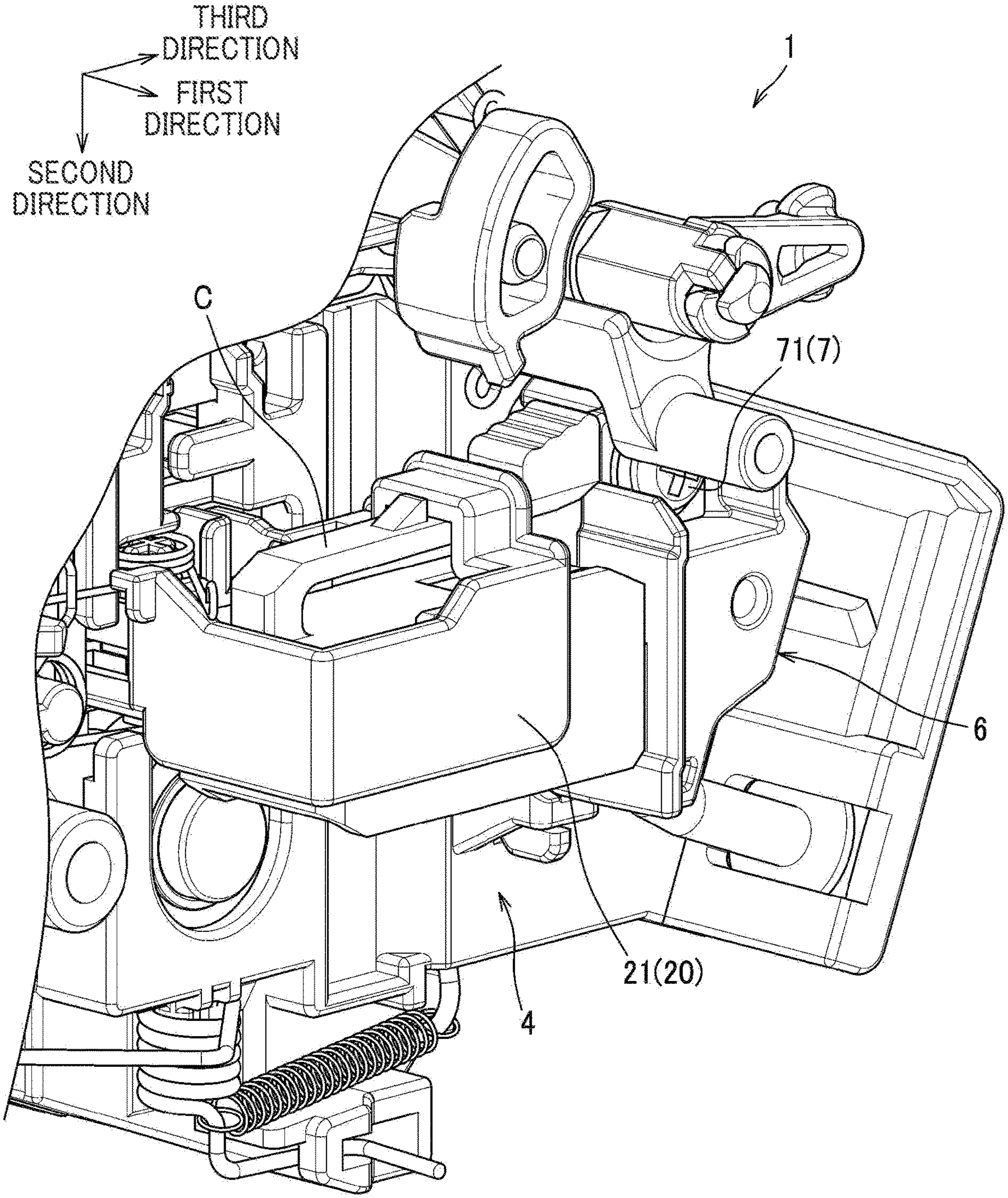
FIG. 3 is a perspective view illustrating a structure in the vicinity of the connector.
Figure 4:
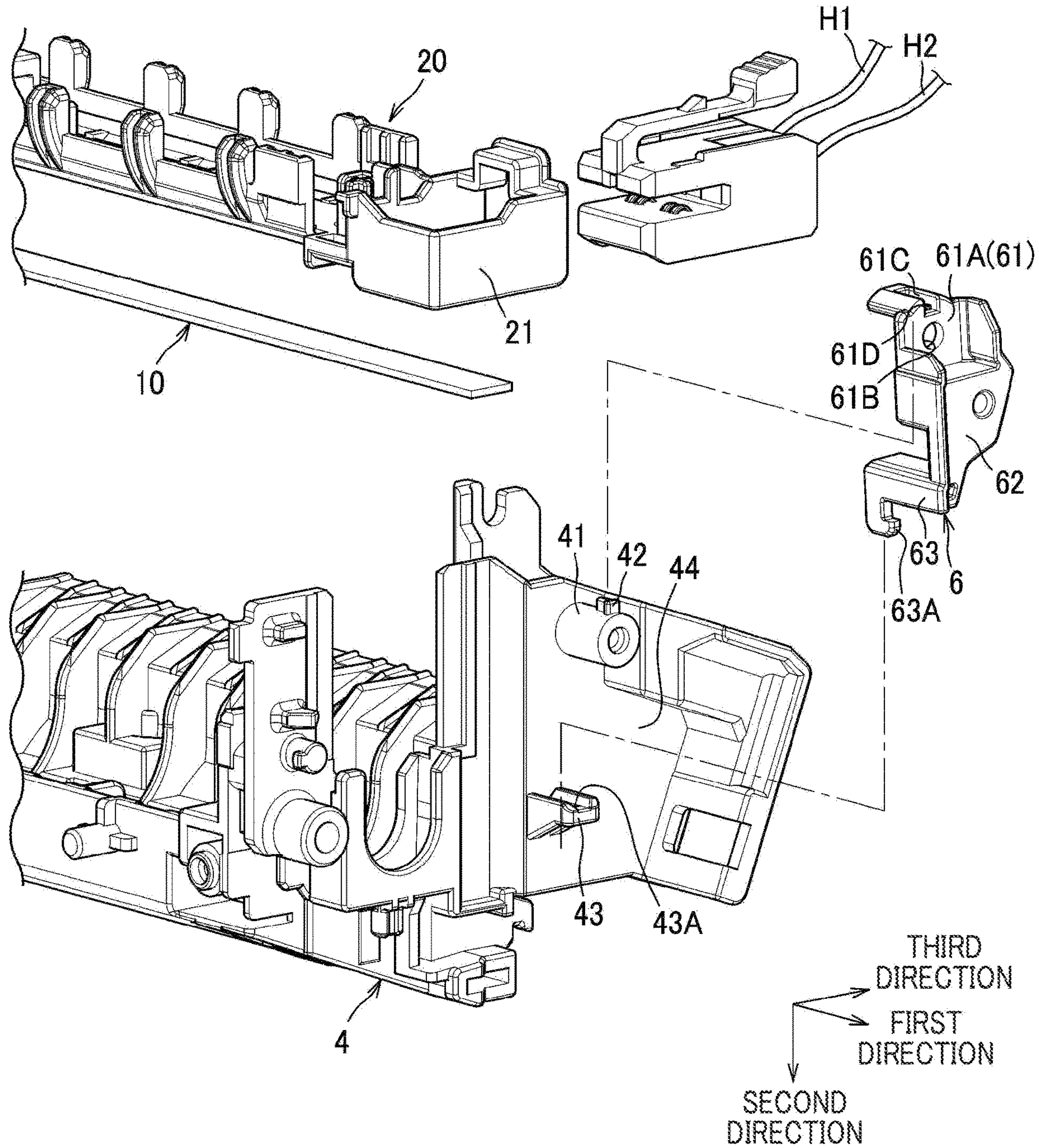
FIG. 4 is an exploded perspective view illustrating the structure in the vicinity of the connector.

As illustrated in FIGS. 3 and 4, the holder 20 has an attachment portion 21. The attachment portion 21 is a part to which the connector C is detachably attached. The attachment portion 21 has a rectangular box shape defining an inner space therein.

The heater 10 has one end portion in the long-side direction positioned in the attachment portion 21. The connector C is attachable to and detachable from the one end portion in the long-side direction along the third direction. Specifically, the connector C is attachable to the heater 10 from one side toward another side in the third direction. Hereinafter, a direction from the one side in the third direction toward the other side in the third direction will also be referred to as "attachment direction". The attachment direction is a direction parallel to the conveying direction of the sheet S. The attachment direction is also a direction orthogonal to the first direction. Specifically, the attachment direction is a direction orthogonal to the first direction and the second direction.

As illustrated in FIG. 4, the fixing device 1 further includes a harness holder 6.

The harness holder 6 holds the harnesses H1 to H3 between the harness holder 6 and the casing 4. The harness holder 6 is a separate component from the casing 4. The harness holder 6 is positioned on the one side of the connector C in the third direction. That is, the harness holder 6 is fixed to the casing 4 and positioned upstream relative to the connector C in the attachment direction. The harness holder 6 is configured to restrict movement of the connector C by making contact with the connector C in a case where the connector C attached to the heater 10 moves upstream in the attachment direction.

Figure 6:
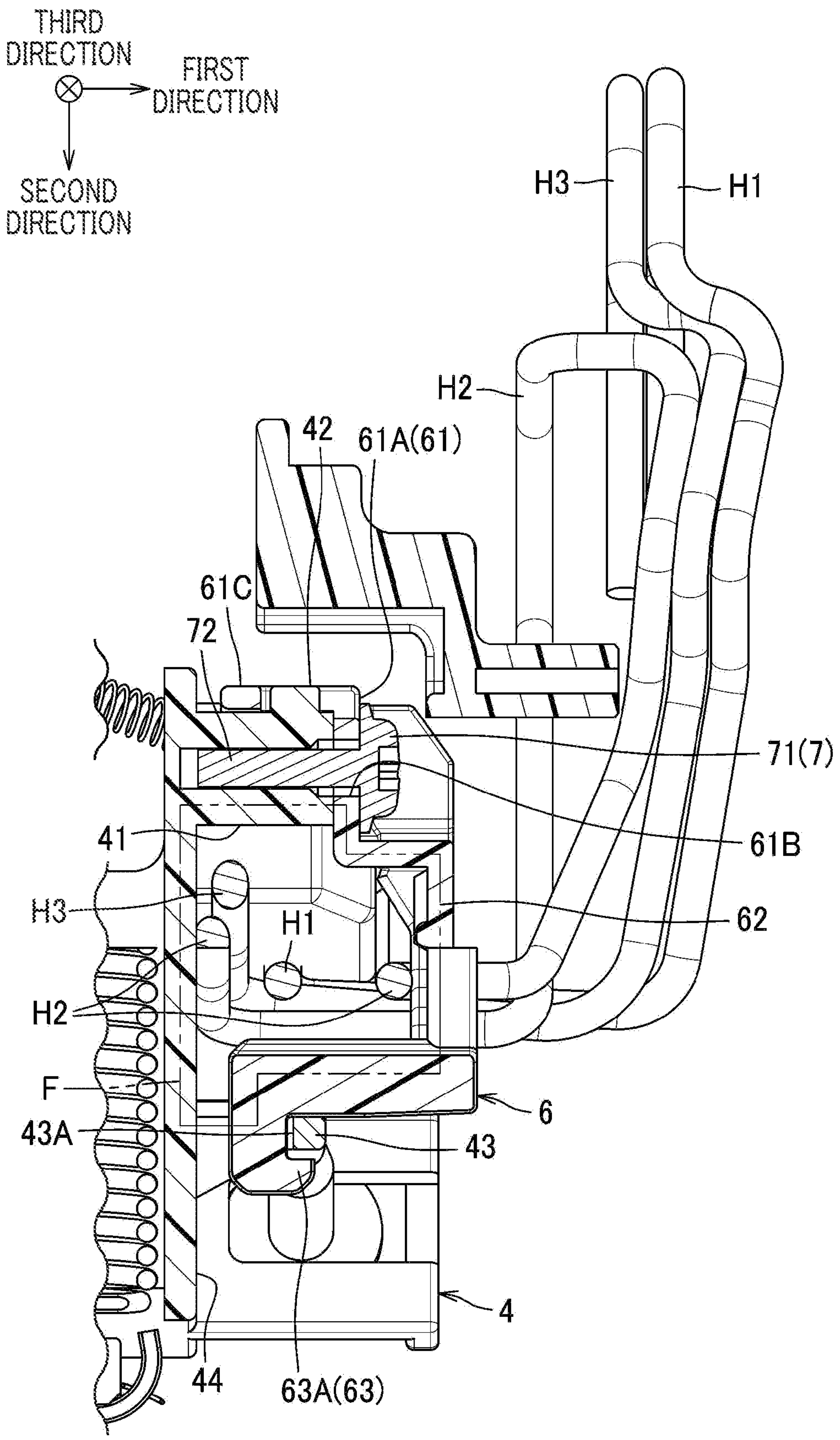
FIG. 6 is a cross-sectional view taken along line VI-VI in FIG. 5A.

As illustrated in FIG. 6, in a state where the harness holder 6 is attached to the casing 4, the harness holder 6 and the casing 4 form a frame F (described later) having a substantially rectangular shape. By attaching the harness holder 6 to the casing 4 while the harnesses H1 to H3 are positioned in the frame F, the harness H1 to H3 are held in the frame F. This configuration restrains the harnesses H1 to H3 from going out of the frame F and making contact with other components in the vicinity thereof to interfere with operations of the other components.

Figure 5A:
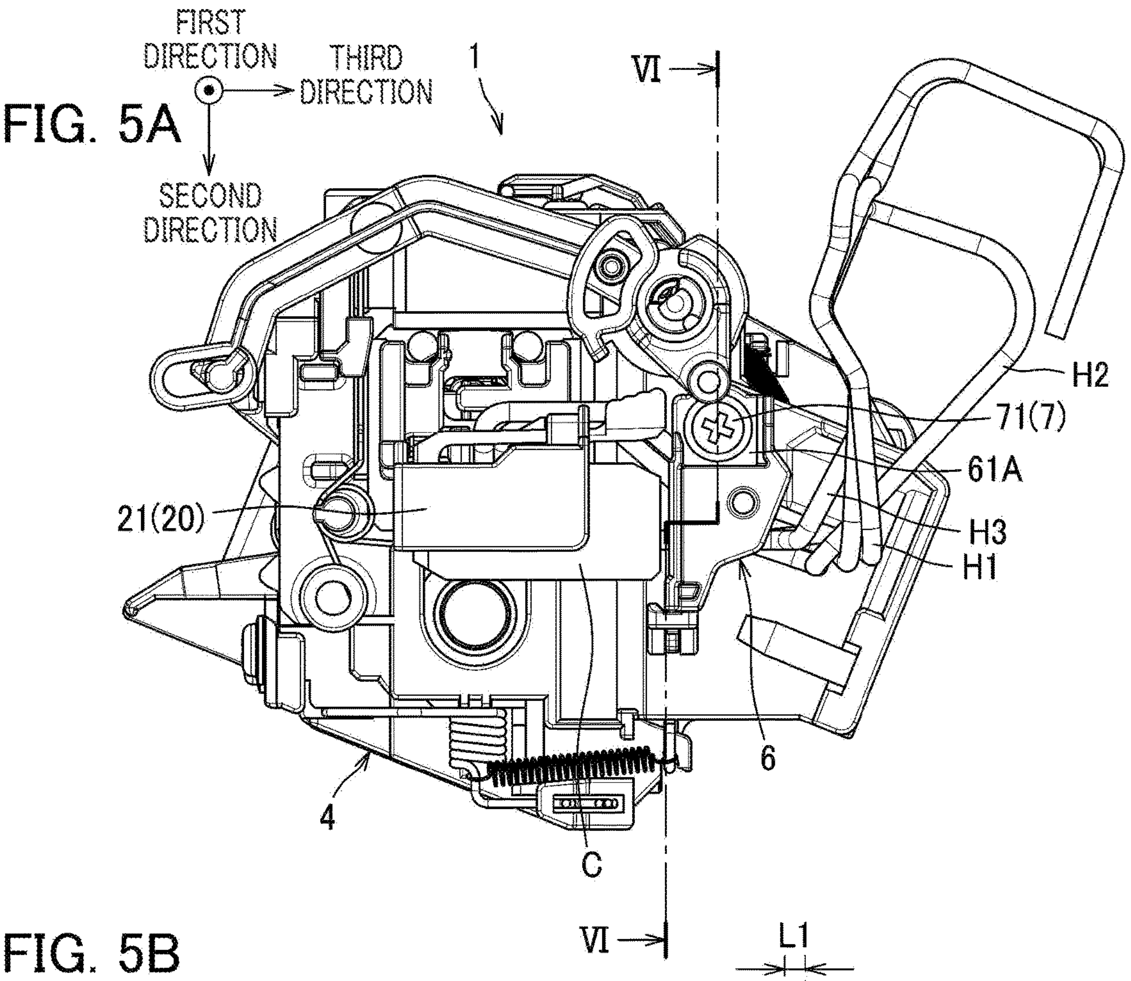
FIG. 5A is a side view of the fixing device as viewed from a side at which the connector is positioned.
Figure 5B:
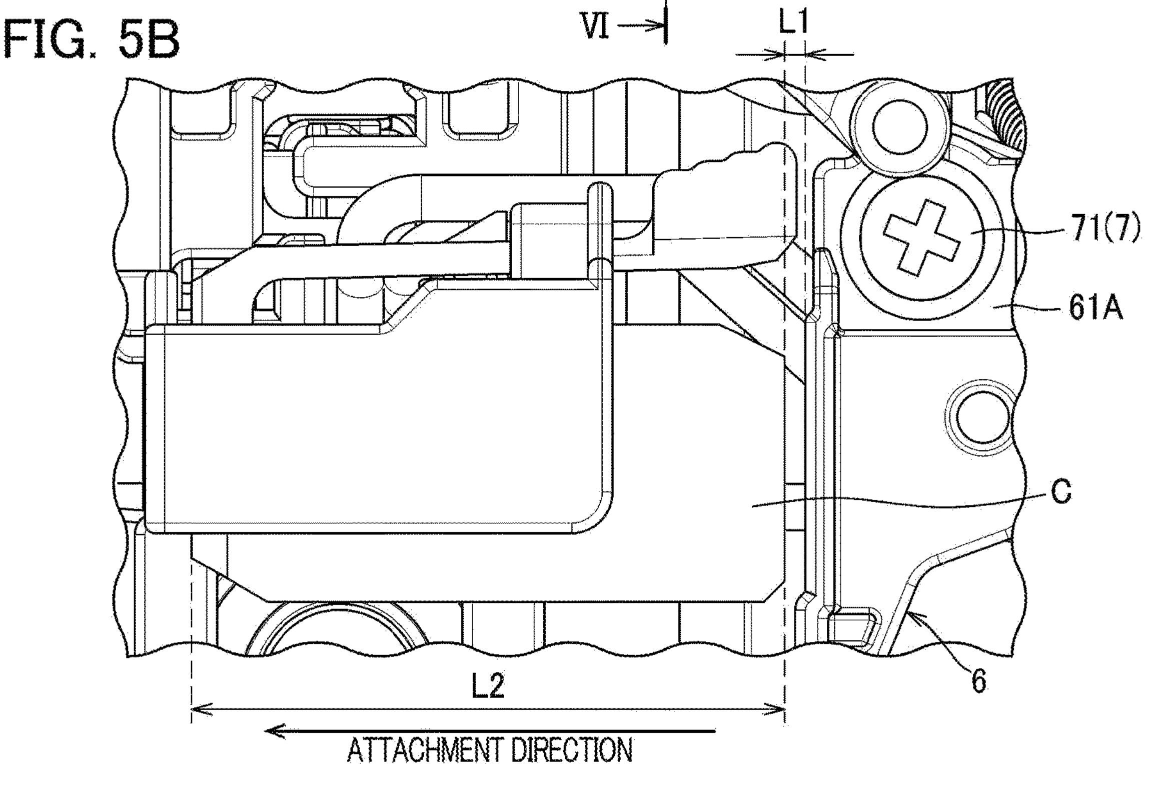
FIG. 5B is an enlarged view showing a relationship between the connector and a harness holder.

As illustrated in FIG. 5B, a gap L1 between the connector C and the harness holder 6 in the attachment direction is smaller than a dimension L2 of the connector C in the attachment direction. Note that the gap L1 may be smaller than a dimension L3 of the power supply terminals 18 in the attachment direction illustrated in FIG. 2A.

As illustrated in FIG. 4, the harness holder 6 has a first end portion 61, a connecting portion 62, and a second end portion 63 opposite the first end portion 61. The first end portion 61 and the second end portion 63 are arranged at different positions in the second direction. The connecting portion 62 is positioned between the first end portion 61 and the second end portion 63 to connect the first end portion 61 and the second end portion 63 to each other.

The first end portion 61 has a seat surface 61A and a hole 61B, and includes a second engaging portion 61C.

The seat surface 61A is in contact with a head portion 71 of a screw 7 illustrated in FIG. 5A. The screw 7 is a screw for fixing the harness holder 6 to the casing 4. The screw 7 also has a screw portion 72 illustrated in FIG. 6. The screw portion 72 has a screw thread. The screw portion 72 extends from the head portion 71.

As illustrated in FIG. 4, the hole 61B is a hole through which the screw portion 72 of the screw 7 is inserted.

The second engaging portion 61C is a part hooked on a protrusion 42 (described later) of the casing 4. The second engaging portion 61C is curved along an outer peripheral surface of a boss 41 (described later) of the casing 4. The second engaging portion 61C has a through-hole 61D that penetrates the second engaging portion 61C in the second direction.

The second end portion 63 includes a first engaging portion 63A. The first engaging portion 63A has a hook shape such that the first engaging portion 63A is hooked on an engagement portion 43 (described later) of the casing 4.

The casing 4 includes the boss 41, the protrusion 42, and the engagement portion 43.

The boss 41 is a boss in which the screw 7 is inserted. The boss 41 has a hollow cylindrical shape. The boss 41 protrudes toward the one side in the first direction from the side surface 44 of the casing 4.

The protrusion 42 protrudes toward the other side in the second direction from the outer peripheral surface of the boss 41. In a state where the harness holder 6 is attached to the casing 4, the protrusion 42 is inserted in the through-hole 61D of the second engaging portion 61C. Specifically, the protrusion 42 is fitted in the through-hole 61D.

By fitting the protrusion 42 in the through-hole 61D, the first end portion 61 of the harness holder 6 is coupled to the casing 4. The first end portion 61 of the harness holder 6 is restrained from moving toward the one side in the second direction by the outer peripheral surface of the boss 41, and is also restrained from moving in the first direction and the third direction by the protrusion 42.

The engagement portion 43 is positioned on the one side in the second direction of the boss 41 to be spaced apart from the boss 41. The engagement portion 43 protrudes toward the one side in the first direction from the side surface 44 of the casing 4. The engagement portion 43 has a through-hole 43A that penetrates the engagement portion 43 in the second direction. In a state where the harness holder 6 is attached to the casing 4, the first engaging portion 63A is inserted in the through-hole 43A and hooked on a distal end of the engagement portion 43.

As a result, the second end portion 63 of the harness holder 6 is coupled to the casing 4. The second end portion 63 of the harness holder 6 is restrained from moving toward the other side in the second direction and from moving in the first direction and the third direction.

As illustrated in FIG. 6, the head portion 71 of the screw 7 and a distal end of the boss 41 nip the first end portion 61 of the harness holder 6 therebetween. In a state where the harness holder 6 is attached to the casing 4, the connecting portion 62 of the harness holder 6 is spaced apart from the side surface 44 of the casing 4.

In a state where the harness holder 6 is attached to the casing 4, each of the harnesses H1 to H3 is positioned between the first end portion 61 of the harness holder 6 and the second end portion 63 of the harness holder 6. Also, in a state where the harness holder 6 is attached to the casing 4, the harnesses H1 to H3 are positioned between the side surface 44 of the casing 4 and the connecting portion 62. Specifically, in a state where the harness holder 6 is attached to the casing 4, a portion of each of the harnesses H1 to H3 is positioned between the first end portion 61 and the second end portion 63, and is positioned between the side surface 44 and the connecting portion 62.

That is, the portions of the harnesses H1 to H3 are positioned inside the substantially rectangular frame F configured of the side surface 44 of the casing 4, the boss 41 of the casing 4, the first end portion 61 of the harness holder 6, the connecting portion 62 of the harness holder 6, the second end portion 63 of the harness holder 6, and the engagement portion 43 of the casing 4. Since the harnesses H1 to H3 are inserted in the frame F, movement in the first direction and the second direction of the harnesses H1 to H3 are restrained.

Note that the harness H2 extends from the connector C toward an outside of the casing 4 after passing through an inside of the frame F, and is bent to pass through the inside of the frame F again and extends toward the inside of the casing 4. Thus, two portions of the harness H2 are positioned inside the frame F.

Next, a method of attaching the harness holder 6 to the casing 4 will be described.

As illustrated in FIGS. 4 and 6, an operator positions the harnesses H1 to H3 such that portions of the harnesses H1 to H3 are arranged between the boss 41 of the casing 4 and the engagement portion 43 of the casing 4. Then, the operator hooks the second engaging portion 61C of the harness holder 6 on the protrusion 42 provided on the outer peripheral surface of the boss 41 while hooking the first engaging portion 63A of the harness holder 6 on the engagement portion 43. Accordingly, the harness holder 6 is temporary fixed to the casing 4, whereby the harness holder 6 is restrained from moving in the first direction, the second direction, the third direction relative to the casing 4.

With the above configuration, when the operator gets his hand off the harness holder 6 after the harness holder 6 is temporary fixed to the casing 4, movement of the harnesses H1 to H3 can be suppressed using the harness holder 6 even when the harnesses H1 to H3 attempt to move toward the one side in the first direction due to stiffness of the harnesses H1 to H3. Furthermore, even when the harness holder 6 is urged toward the one side in the first direction due to the stiffness of the harnesses H1 to H3, unintentional detachment of the harness holder 6 from the casing 4 can be suppressed since the harness holder 6 is temporary fixed to the casing 4.

After the harness holder 6 is temporary fixed to the casing 4, the operator inserts the screw portion 72 of the screw 7 through the hole 61B of the harness holder 6 and in an inner peripheral surface of the boss 41 to fix the harness holder 6 to the casing 4.

According to the present embodiment, the following technical advantages can be obtained.

Since the harness holder 6 is configured such that the harness holder 6 holds the harnesses H1 to H3 between the casing 4 and the harness holder 6, the harnesses H1 to H3 can be restrained from interfering the operation of the other components in the vicinity of the harnesses H1 to H3 by contacting other components due to irregular movement. Also, since the harness holder 6 is fixed to the casing 4 and positioned upstream relative to the connector C in the attachment direction, unintentional detachment of the connector C from the heating unit 2 can be restrained using the harness holder 6.

Since the heating unit 2 is movable in the second direction crossing the attachment direction in which the harness holder 6 and the connector C are arranged, the connector C does not interfere with the harness holder 6 even when the heating unit 2 moves in the second direction.

Since the harnesses H1 to H3 are positioned between the first end portion 61 and the second end portion 63 which are coupled to the casing 4, the harnesses H1 to H3 can be restrained from coming out of the harness holder 6 through a side at which the first end portion 61 is positioned or a side at which the second end portion 63 is positioned.

Since the harness holder 6 includes the first engaging portion 63A and the second engaging portion 61C for temporarily fixing the harness holder 6 to the casing 4, the harness holder 6 is restrained from being disengaged from the casing 4 by the stiffness of the harnesses H1 to H3 in a state prior to the harness holder 6 being fixed to the casing 4 by the screw 7.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The attachment direction of the connector C need not be orthogonal to the first direction, but just needs to cross the first direction. The second direction need not be orthogonal to both the first direction and the attachment direction, and just needs to cross both the first direction and the attachment direction.

Although the harness holder 6 includes the second engaging portion 61C in the above embodiment, the second engaging portion 61C may be omitted.

The attachment direction need not be parallel to the conveying direction of the sheet S.

The heating unit 2 serves as the heating portion in the above embodiment, but the present disclosure need not be this configuration. For example, the heating portion may be a heating roller. Alternatively, the heating portion may have a configuration including a belt, a nipping plate that makes contact with an inner peripheral surface of the belt, and a heat source configured to apply heat to the belt and the nipping plate.

The pressure portion need not be limited to the pressure roller 3, and may have a configuration including a belt, and a rubber pad positioned in a space encircled by the belt.

The elements appearing in the embodiment and modifications described above may be suitably combined to be implemented.

What is claimed is:

1. A fixing device comprising:

a casing;

a heating portion extending in a first direction and configured to apply heat to a sheet;

a pressure portion configured to form a nipping region between the pressure portion and the heating portion;

a connector detachably attached to the heating portion;

a harness connected to the connector for supplying electric power to the heating portion through the connector; and a harness holder fixed to the casing, the harness holder being positioned upstream relative to the connector in an attachment direction of the connector to the heating portion, the attachment direction crossing the first direction, the harness holder holding the harness between the harness holder and the casing, the harness holder being configured to restrict movement of the connector by making contact with the connector in a case where the connector moves upstream in the attachment direction, wherein the harness holder has a first end portion and a second end portion opposite the first end portion, and a connecting portion connecting the first end portion and the second end portion to each other, wherein the connecting portion is positioned away from the casing, and wherein the harness has a portion positioned between the connecting portion and the casing in the first direction.

2. The fixing device according to claim 1, wherein the harness is positioned between the first end portion and the second end portion, and wherein the first end portion and the second end portion are coupled to the casing.

3. The fixing device according to claim 2, wherein the first end portion and the second end portion are arranged at different positions in a second direction crossing both the first direction and the attachment direction.

4. The fixing device according to claim 3, wherein the first end portion has:

a seat surface in contact with a head portion of a screw; and a hole through which a screw portion of the screw is inserted, and wherein the second end portion comprises:

a first engaging portion hooked on the casing.

5. The fixing device according to claim 4, wherein the first end portion comprises:

a second engaging portion hooked on the casing.

6. The fixing device according to claim 1, wherein the attachment direction is parallel to a conveying direction of the sheet.

7. The fixing device according to claim 6, wherein a gap between the connector and the harness holder in the attachment direction is smaller than a dimension of the connector in the attachment direction.

8. The fixing device according to claim 7, wherein the heating portion comprises a power supply terminal configured to receive electric power through the connector, and wherein the gap between the connector and the harness holder in the attachment direction is smaller than a dimension of the power supply terminal in the attachment direction.

9. The fixing device according to claim 1, wherein the heating portion is movable in a second direction crossing both the first direction and the attachment direction.

10. The fixing device according to claim 1, wherein the heating portion comprises:

an endless belt; and a heater having a plate shape and positioned in a space encircled by the endless belt, and wherein the pressure portion is a pressure roller configured to nip, in cooperation with the heater, the endless belt between the pressure roller and the heater.

* * * * *